(12) United States Patent
Millner et al.

(10) Patent No.: US 9,797,026 B2
(45) Date of Patent: Oct. 24, 2017

(54) REFORMER-GAS-BASED REDUCTION PROCESS WITH DECARBONIZATION OF THE FUEL GAS FOR THE REFORMER

(71) Applicant: PRIMETALS TECHNOLOGIES AUSTRIA GMBH, Linz (AT)

(72) Inventors: Robert Millner, Loosdorf (AT); Guenter Peer, Gunskirchen (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 0 days.

(21) Appl. No.: 14/811,037

(22) Filed: Jul. 28, 2015

(65) Prior Publication Data

US 2015/0329930 A1 Nov. 19, 2015

Related U.S. Application Data

(62) Division of application No. 13/387,895, filed as application No. PCT/EP2010/060130 on Jul. 14, 2010, now Pat. No. 9,169,535.

(30) Foreign Application Priority Data

Jul. 31, 2009 (AT) .................................. A1217/2009

(51) Int. Cl.
  *C21B 11/10* (2006.01)
  *C22B 5/12* (2006.01)
  (Continued)

(52) U.S. Cl.
  CPC ............ *C22B 5/12* (2013.01); *C21B 13/0073* (2013.01); *C21B 13/02* (2013.01); *Y02P 10/122* (2015.11);
  (Continued)

(58) Field of Classification Search
  CPC ...................................................... C21B 13/02
  See application file for complete search history.

(56) References Cited

U.S. PATENT DOCUMENTS

| 3,909,244 A | 9/1975 | Rose et al. |
| 4,087,275 A | 5/1978 | Beggs |

(Continued)

FOREIGN PATENT DOCUMENTS

| AT | 638543 | 7/1993 |
| CN | 1053898 | 8/1991 |

(Continued)

OTHER PUBLICATIONS

International Search Report dated Oct. 27, 2010, issued in corresponding international application No. PCT/EP2010/060130.

(Continued)

*Primary Examiner* — Alexander Polyansky
(74) *Attorney, Agent, or Firm* — Ostrolenk Faber LLP

(57) ABSTRACT

In a process and apparatus for the reduction of metal oxides to form metalized material by contact with hot reducing gas, which is produced at least partially by catalytic reformation of a mixture of—a gas containing carbon dioxide ($CO_2$) and/or steam ($H_2O$) with—gaseous hydrocarbons, the fuel gas for burners which provide the heat for the endothermal reformation processes which take place during the reformation is obtained at least partially from a partial quantity of the top gas produced during the reduction of metal oxides to form metalized material, wherein this partial quantity of the top gas, before it is used as a component of the fuel gas, is firstly subjected to dedusting and then to a CO conversion reaction, and the conversion gas obtained during the CO conversion reaction is subjected to $CO_2$ removal after cooling.

14 Claims, 2 Drawing Sheets

(51) Int. Cl.
*C21B 13/00* (2006.01)
*C21B 13/02* (2006.01)

(52) U.S. Cl.
CPC ........... *Y02P 10/128* (2015.11); *Y02P 10/132* (2015.11); *Y02P 10/136* (2015.11); *Y02P 10/212* (2015.11); *Y02W 30/54* (2015.05)

(56) References Cited

U.S. PATENT DOCUMENTS

| | | |
|---|---|---|
| 5,439,504 A | 8/1995 | Czermak |
| 5,958,107 A | 9/1999 | Greenwalt |
| 6,183,535 B1 | 2/2001 | De-Gyves-De-la-Pena et al. |

FOREIGN PATENT DOCUMENTS

| | | |
|---|---|---|
| DE | 2651309 | 5/1977 |
| GB | 748167 | 4/1956 |
| JP | 61099613 | 5/1986 |
| JP | 1099613 | 4/1998 |
| RU | 93005022 | 9/1996 |
| WO | WO 2005/054520 | 6/2005 |
| WO | WO 2006/135984 | 12/2006 |
| WO | WO 2009/037587 | 3/2009 |

OTHER PUBLICATIONS

Russian Federation Decision of Grant dated May 20, 2014 issued in Russian Patent Application No. 2012107479/02(011287).

REFORMER-GAS-BASED REDUCTION PROCESS WITH DECARBONIZATION OF THE FUEL GAS FOR THE REFORMER

CROSS-REFERENCE TO RELATED APPLICATIONS

The present application is a divisional under 37 C.F.R. §1.53(b) of prior U.S. patent application Ser. No. 13/387,895, filed Mar. 16, 2012, which in turn is a U.S.C. §371 National Phase conversion of PCT/EP2010/060130, filed Jul. 14, 2010, which claims priority of Austrian Patent Application No. A1217/2009, filed Jul. 31, 2009. The contents of each of these applications are incorporated in full by reference herein.

TECHNICAL FIELD

The present invention relates to a process for the reduction of metal oxides to form metalized material by contact with hot reducing gas, which is produced at least partially by catalytic reformation of a mixture of
a gas containing carbon dioxide ($CO_2$) and/or steam ($H_2O$) with
gaseous hydrocarbons,
wherein the fuel gas for burners which provide the heat for the endothermal reformation processes which take place during the reformation is obtained at least partially from a partial quantity of the top gas produced during the reduction of metal oxides to form metalized material, wherein this partial quantity of the top gas, before it is used as a component of the fuel gas, is firstly subjected to dedusting and then to a CO conversion reaction, and the conversion gas obtained during the CO conversion reaction is subjected to $CO_2$ removal after cooling. Furthermore, the present invention relates to an apparatus for carrying out the process.

BACKGROUND

By way of example, FIG. 1 of WO2006135984 describes a process for the reduction of metal oxides to form metalized material by contact with hot reducing gas, which is produced by catalytic reformation of a mixture of natural gas with the top gas taken from the reduction unit, wherein the fuel gas for burners which provide the heat for the endothermal reformation processes which take place during the reformation is obtained from a partial quantity of the top gas produced during the reduction of metal oxides to form metalized material and from natural gas. Owing to ever more stringent statutory environmental regulations, it is desirable to separate $CO_2$ in order to produce a concentrated $CO_2$ flow from the off-gases produced during the processes, with the possibility of subsequent sequestration of the $CO_2$ flow, before the off-gases treated in this way are released into the environment. In the case of a process as shown in WO2006135984, the fuel gas for the reformer is combusted with air as the oxygen source, for which reason the combustion off-gas contains a large quantity of nitrogen. Correspondingly, downstream plants for removing $CO_2$ from the combustion off-gas have to have large dimensions. Additionally, substantially only chemical absorption processes are suitable for removing $CO_2$ from the combustion off-gas, and these are distinguished by a large plant size and a high consumption of energy, which is supplied, for example, using steam.

SUMMARY

According to various embodiments, a process can be provided which makes it possible to avoid the presence of $CO_2$ in the combustion off-gas using smaller plants—with correspondingly lower levels of consumption—and makes other $CO_2$ removal processes possible, and also an apparatus for carrying out the process.

According to an embodiment, in a process for the reduction of metal oxides to form metalized material by contact with hot reducing gas, the reducing gas is produced at least partially by catalytic reformation of a mixture of—a gas containing carbon dioxide (CO2) and/or steam (H2O) with—gaseous hydrocarbons, wherein the heat for the endothermal reformation processes which take place during the reformation is provided at least partially by the combustion of a fuel gas, and the combustion off-gas produced in the process is drawn off, wherein the fuel gas is obtained at least partially from a partial quantity of the top gas produced during the reduction of metal oxides to form metalized material, and wherein the partial quantity of the top gas, from which the fuel gas is obtained, is firstly subjected to dedusting and then to a CO conversion reaction, and the conversion gas obtained during the CO conversion reaction is subjected to CO2 removal after cooling, and the CO2-depleted conversion gas produced in the process is used at least as a component of the fuel gas.

According to a further embodiment, the gas containing carbon dioxide (CO2) and/or steam (H2O) can be top gas from the process for the reduction of metal oxides. According to a further embodiment, the gas containing carbon dioxide (CO2) and/or steam (H2O) can be export gas from a smelting reduction process or syngas from a coal gasification process. According to a further embodiment, gaseous hydrocarbons can be admixed to the CO2-depleted conversion gas in order to obtain fuel gas. According to a further embodiment, the dedusting may take place in dry form or in wet form.

According to another embodiment, an apparatus for carrying out the process as described above, may have a reduction unit for the reduction of metal oxides to form metalized material, and a reformer for carrying out catalytic reformation of a mixture of—a gas containing carbon dioxide (CO2) and/or steam (H2O) with—gaseous hydrocarbons, wherein the reformer is provided with a mixture supply line for supplying the mixture, and wherein the reformer is provided with burners, which are connected to an oxygen supply line, for providing heat by the combustion of fuel gas, having a drawing-off line for drawing off combustion off-gas from the reformer, having a reducing gas supply line for hot reducing gas from the reformer into the reduction unit, having a discharge line for discharging top gas from the reduction unit, wherein the burners are connected to the discharge line via a connection line which branches off from the discharge line, and wherein a dedusting apparatus is present at least in the discharge line between the reduction unit and the connection line which branches off from it, or in the connection line, wherein a CO conversion reactor, a gas cooling apparatus and a CO2 removal apparatus are present in succession, as seen from the discharge line, in the connection line, between the dedusting device which may be present and the burners.

According to a further embodiment of the apparatus, a hydrocarbon feed line for gaseous hydrocarbons may issue into the connection line. According to a further embodiment of the apparatus, the hydrocarbon feed line for gaseous hydrocarbons may issue into the connection line downstream from the CO2 removal apparatus, as seen from the discharge line. According to a further embodiment of the apparatus, the dedusting apparatus can be a dry-dedusting apparatus. According to a further embodiment of the apparatus, the dedusting apparatus can be a wet-dedusting apparatus. According to a further embodiment of the apparatus, a gas heating apparatus can be present in the connection line between the wet-dedusting apparatus and the CO conversion reactor. According to a further embodiment of the apparatus, the reduction unit can be a fluidized bed cascade. According to a further embodiment of the apparatus, the reduction unit can be a fixed-bed reduction shaft.

BRIEF DESCRIPTION OF THE DRAWINGS

In the text which follows, the various embodiments are explained in more detail with reference to a plurality of schematic figures.

DETAILED DESCRIPTION

Figure 1:
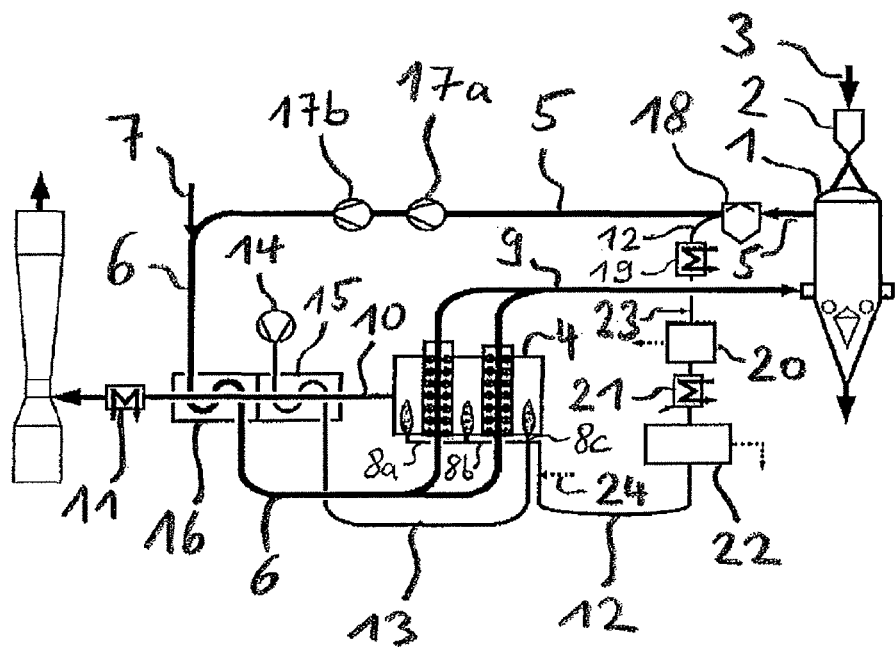
FIG. 1 shows an apparatus according to various embodiments with wet dedusting.

As stated above, according to various embodiments, in a process for the reduction of metal oxides to form metalized material by contact with hot reducing gas, the reducing gas is produced at least partially by catalytic reformation of a mixture of
 a gas containing carbon dioxide ($CO_2$) and/or steam ($H_2O$) with
 gaseous hydrocarbons,
wherein the heat for the endothermal reformation processes which take place during the reformation is provided at least partially by the combustion of a fuel gas, and the combustion off-gas produced in the process is drawn off, wherein the fuel gas is obtained at least partially from a partial quantity of the top gas produced during the reduction of metal oxides to form metalized material, characterized in that the partial quantity of the top gas, from which the fuel gas is obtained, is firstly subjected to dedusting and then to a CO conversion reaction, and the conversion gas obtained during the CO conversion reaction is subjected to $CO_2$ removal after cooling, and the $CO_2$-depleted conversion gas produced in the process is used at least as a component of the fuel gas.

The metal oxides are preferably iron oxides. However, according to the Richardson-Jeffes diagram, nickel, copper, lead and cobalt can furthermore also be reduced, for example.

The reducing gas is produced at least partially by catalytic reformation of a mixture of
 a gas containing carbon dioxide $CO_2$ and/or steam $H_2O$ with
 gaseous hydrocarbons.

This reformation takes place by at least partial conversion of the gaseous hydrocarbons with $H_2O$ and $CO_2$ to form hydrogen ($H_2$) and carbon monoxide (CO). The substances $H_2O$ and/or $CO_2$ required for the reformation can be added to the mixture for reformation in each case individually or together, and/or the $H_2O$ and/or $CO_2$ present in the gas containing carbon dioxide $CO_2$ and/or steam $H_2O$ is used. It is preferable to add at least $H_2O$—as steam—to the mixture.

Gaseous hydrocarbons are to be understood as meaning, for example, natural gas, methane, propane, syngas from coal gasification or coke furnace gas. The term "gaseous hydrocarbons" includes both the possibility that only one compound, for example pure propane, is present, and also the possibility that a mixture of a plurality of compounds is present, for example a mixture of propane and methane.

The gas containing carbon dioxide $CO_2$ and/or steam $H_2O$ is, for example, top gas from the process according to various embodiments for the reduction of metal oxides. In this case, top gas is to be understood as meaning the gas which is discharged from the reduction unit in which the metal oxides are reduced to form metalized material. Before the reformation, the top gas may also be cleaned, for example by the separation of dust and/or water carried along.

The gas containing carbon dioxide $CO_2$ and/or steam $H_2O$ can also be, for example, export gas from a different process for the reduction of metal oxides, for example a smelting reduction process, or syngas from a coal gasification process, for example a Lurgi fixed-bed gasifier or Siemens entrained-flow gasifier.

With preference, the gas is top gas from the process according to various embodiments for the reduction of metal oxides.

Table 1 shows a typical composition of top gas from a direct reduction process:

TABLE 1

| Typical gas composition of DR top gas | |
|---|---|
| | Top gas composition after gas cleaning |
| CO [% by volume] | 20-25 |
| $CO_2$ [% by volume] | 15-20 |
| $H_2$ [% by volume] | 40-46 |
| $H_2O$ [% by volume] | 0-18 |
| $CH_4$ [% by volume] | 2-4 |
| $N_2$ [% by volume] | 1-2 |

In the gas containing carbon dioxide $CO_2$ and/or steam $H_2O$, the lower limit for the carbon dioxide $CO_2$ content is 0% by volume, preferably 5% by volume, particularly preferably 15% by volume, and the upper limit for the carbon dioxide $CO_2$ content is 25% by volume, preferably 30% by volume, particularly preferably 40% by volume.

In the gas containing carbon dioxide $CO_2$ and/or steam $H_2O$, the lower limit for the steam $H_2O$ content is 0% by volume, preferably 10% by volume, and the upper limit for the steam $H_2O$ content is 20% by volume, preferably 55% by volume.

The catalytic reformation produces a reducing gas which contains principally $H_2$ and CO as reducing constituents. It is known that such reformation involves an endothermal reaction, and for this reason heat is supplied to the reformer, for example by the combustion of fuel gas with oxygen, in burners associated with the reformer. By way of example, the oxygen is provided by the supply of air, the supply of a different oxygen-containing gas mixture or the supply of technically pure oxygen.

In order to increase the efficiency of the process as a whole, the fuel gas is obtained at least partially from a partial quantity of the top gas produced during the reduction of metal oxides to form metalized material. This top gas also contains combustible constituents, for example CO and $H_2$, which are used in the burners of the reformer to produce the heat required for the reformation.

According to various embodiments, the partial quantity of the top gas, from which the fuel gas is obtained, is subjected to a CO conversion reaction (also referred to as a CO shift reaction or water gas shift reaction). This known reaction serves to simultaneously reduce the CO content in the top gas and increase the $H_2$ content, with $CO_2$ being formed simultaneously.

$$CO+H_2O \leftrightarrow CO_2+H_2 \Delta H^0_{R\ 298} = -41.2\ kJ/mol$$

After the CO conversion reaction, according to various embodiments the $CO_2$ and $H_2O$ contents are cooled and removed in a $CO_2$ removal plant, before they are used as fuel gas. Here, the $CO_2$ is already efficiently separated before the combustion. Accordingly, the effort required to remove $CO_2$ from the combustion off-gas can be reduced.

By virtue of these measures, a fuel gas containing principally hydrogen $H_2$ as combustible component is supplied to the burners of the reformer. This has the advantage that less $CO_2$ is produced as a result of combustion in the burners, since the proportion of CO components which generate $CO_2$ during the combustion in the fuel gas is low.

The CO conversion reaction preferably takes place on the basis of high-temperature or crude-gas conversion processes, since neither of these processes is overly sensitive to the presence of hydrogen sulfide ($H_2S$) in the gas flow to be treated.

The CO conversion reaction is an exothermal reaction, but can also be an isothermal reaction and in this case can be used, for example, for producing steam. Depending on the CO conversion process, an inlet temperature of 160-450° C., preferably 300-450° C. in the case of a high-temperature CO conversion process, has to be complied with for operation of the CO conversion reactor. If the top gas is washed when wet before the CO conversion reaction, it is necessary to carry out heating to such temperatures after the wet wash owing to the associated drop in temperature. If the top gas is dedusted when dry before the CO conversion reaction, the temperature of the top gas can equally be employed for the subsequent CO conversion reaction.

According to various embodiments, the CO conversion reaction is followed by cooling and separation of $CO_2$ and $H_2O$ from the flow of the conversion gas obtained during the CO conversion reaction. Since the flow of the conversion gas contains only a small amount of nitrogen compared to the combustion off-gas, and the $CO_2$ is accordingly present in more concentrated form than in the combustion off-gas, and because the $CO_2$ is removed before the combustion, the gas volume to be subjected to $CO_2$ removal is less than in the case of the removal of $CO_2$ from combustion off-gas. Accordingly, the removal is less complex. $CO_2$ does not make a contribution to the calorific value of the fuel gas. In conventional processes for the use of top gas—which already contains $CO_2$ after the reduction of the metal oxides—in the fuel gas, it is therefore often necessary to admix gaseous hydrocarbons, for example natural gas, in order to increase the calorific value of the fuel gas to an extent required to achieve the required flame temperature in the reformer. Since, according to various embodiments, the $CO_2$ is removed before the combustion—and owing to the associated increase in the calorific value of the fuel gas—it is generally possible to dispense with such an admixture of gaseous hydrocarbons. It is of course also possible to admix gaseous hydrocarbons if required.

Such an admixture can be carried out such that gaseous hydrocarbons are admixed to the $CO_2$-depleted conversion gas in order to produce fuel gas.

If nothing is admixed to the $CO_2$-depleted conversion gas before it is used as fuel gas, the $CO_2$-depleted conversion gas is the fuel gas. If something is admixed to the $CO_2$-depleted conversion gas, for example gaseous hydrocarbons, this is a component of the fuel gas.

A further advantage of various embodiments is that the combustion off-gas can be used extremely effectively as seal gas after possible separation of water. A seal gas is defined as a noncombustible and inert gas for sealing off the outlet of process gas and for providing an inert atmosphere over a material. Seal gas is used, for example, for the charging of raw materials and in the shaft discharge of a reduction shaft, or for hot conveyors. The gas obtained after possible separation of water from the combustion off-gas in the process according to various embodiments contains, as main constituent, nitrogen and barely any $CO_2$. By contrast, combustion off-gas produced according to a process as shown in FIG. 1 of WO2006135984 contains 18 to 20% by volume $CO_2$, which can lead to reoxidation and thus to product impairment on contact with product from the reduction process, for example hot DRI (direct reduced iron), for example in the shaft discharge of a reduction shaft or in hot conveyors. When the combustion off-gas produced according to various embodiments is used as seal gas, a risk of this nature does not arise.

Owing to the high temperature of the conversion gas produced, it is necessary in the process according to various embodiments for the conversion gas to be cooled before the $CO_2$ removal in order to obtain a temperature required for the $CO_2$ removal, preferably from 30-60° C. Steam which is introduced during the conversion reaction, but is unconverted, is preferably also removed from the conversion gas by condensation.

Furthermore, it is necessary to dedust the partial quantity of the top gas, from which fuel gas is obtained, before the CO conversion reaction, in order to keep the outlay in terms of maintenance resulting from deposits and damage to plant components low, to ensure high availability of the plant and also to comply with the environmental regulations regarding the dust content of gases released into the environment. The dedusting can take place in wet or dry form. The advantage of dry dedusting is that the heat content can be used for the purpose of carrying out the CO conversion reaction at the required temperature. The outlet temperature of top gas from a reduction unit is typically in the range of 250-500° C. For optimum temperature control for the subsequent process steps, it may be necessary to adjust the temperature a bit more by cooling, heating or evaporation of water. The heat content is advantageously used to produce steam, which is needed in order to carry out the CO conversion reaction. It is also advantageous if the steam needed in order to carry out the CO conversion reaction is obtained at other stations of the process according to various embodiments.

In the event of wet dedusting, it may be necessary for the top gas flow to be heated before the CO conversion reaction is carried out, in order to ensure that the temperature of the gas flow required for the CO conversion reaction is obtained.

The dedusting can take place in a manner such that all of the top gas is dedusted, and after this dedusting a partial quantity is branched off in order to obtain fuel gas, or the dedusting can take place after the partial quantity has been branched off in order to obtain fuel gas.

By way of example, the $CO_2$ produced during the $CO_2$ removal can be compressed, condensed and/or sequestered, in order to lower the $CO_2$ emissions of the process which are emitted to the environmental atmosphere.

According to yet another embodiment, an apparatus for carrying out the process, may have a reduction unit for the reduction of metal oxides to form metalized material, a reformer for carrying out catalytic reformation of a mixture of
- a gas containing carbon dioxide ($CO_2$) and/or steam ($H_2O$) with
- gaseous hydrocarbons, wherein the reformer is provided with a mixture supply line for supplying the mixture, and wherein the reformer is provided with burners, which are connected to an oxygen supply line, for providing heat by the combustion of fuel gas, having a drawing-off line for drawing off combustion off-gas from the reformer, having a reducing gas supply line for hot reducing gas from the reformer into the reduction unit, having a discharge line for discharging top gas from the reduction unit, wherein the burners are connected to the discharge line via a connection line which branches off from the discharge line, and wherein a dedusting apparatus is present at least in the discharge line between the reduction unit and the connection line which branches off from it, or in the connection line, characterized in that a CO conversion reactor, a gas cooling apparatus and a $CO_2$ removal apparatus are present in succession, as seen from the discharge line, in the connection line, between the dedusting device which may be present and the burners.

The gaseous hydrocarbons are typically natural gas, methane or propane.

According to one embodiment, a hydrocarbon feed line for gaseous hydrocarbons issues into the connection line, as a result of which it is possible, if required, to admix gaseous hydrocarbons, in order to obtain a fuel gas with the desired calorific value.

In this case, the hydrocarbon feed line for gaseous hydrocarbons can issue into the connection line downstream from the $CO_2$ removal apparatus, as seen from the discharge line.

According to one embodiment, the dedusting apparatus is a dry-dedusting apparatus, for example a cyclone, a hot-gas filter or a bag filter.

According to another embodiment, the dedusting apparatus is a wet-dedusting apparatus.

It is also possible for more than one dedusting apparatus to be present. These can be arranged, for example, both in the discharge line between the reduction unit and the connection line which branches off from it and in the connection line.

According to one embodiment, in this case, by way of example, a wet-dedusting apparatus is arranged in the discharge line between the reduction unit and the connection line which branches off from it, and a dry-dedusting apparatus is arranged in the connection line.

In this case, a gas heating apparatus is preferably present in the connection line between the wet-dedusting apparatus and the CO conversion reactor.

In FIG. 1, metal oxides 3—in the present case iron oxides—are added to a reduction unit 1, here a fixed-bed reduction shaft, via the oxide addition apparatus 2, for example as pellets or lump ore. The top gas, which is produced from the reducing gas in the reduction unit during the reduction of the metal oxides to form metalized material, is discharged from the reduction unit via the discharge line 5. Compressors 17a, 17b are present in the discharge line 5 in order to overcome the pressure drop which occurs in the plant. A mixture of top gas and gaseous hydrocarbons, in this case natural gas, is supplied via a mixture supply line 6 into a reformer 4 for the catalytic reformation of a mixture of top gas and gaseous hydrocarbons. Here, the natural gas is supplied via the natural gas line 7. The reformer 4 is provided with burners 8a, 8b, 8c for providing heat required for the reformation by the combustion of fuel gas. The hot reducing gas formed in the reformer 4 is supplied to the reduction unit 1 via the reducing gas supply line 9. The combustion off-gas is drawn off from the reformer via a drawing-off line 10 for drawing off the combustion off-gas produced during the combustion of fuel gas in the reformer. In the process, the combustion off-gas flows out of the reformer 4.

The drawing-off line 10 comprises an apparatus 11 for cooling the combustion off-gas and for removing water from the combustion off-gas. Cooling and removal of water take place in the same apparatus. The drawing-off line 10 leads into a chimney, through which the combustion off-gas can be released into the environment.

Steam, which can be used for the CO conversion, can also be produced by the apparatus 11 or by further process waste heat, for example from top gas or the conversion gas after the CO conversion.

The burners 8a, 8b, 8c are provided with apparatuses for supplying fuel gas, represented by the connection line 12 which branches off from the discharge line 5. Fuel gas is fed to the burners 8a, 8b, 8c through the connection line 12.

The oxygen required for the combustion of the fuel gas is supplied to the burners 8a, 8b, 8c via the oxygen supply line 13 for supplying oxygen—in this case by means of the supply of air. The air is fed into the oxygen supply line by means of a blower 14.

The drawing-off line 10 is provided with an apparatus for heating the air guided in the oxygen supply line 13, in this case a recuperator 15 for indirect heat exchange between the air in the oxygen supply line 13 and the combustion off-gas in the drawing-off line 10.

Furthermore, the drawing-off line 10 is provided with an apparatus for heating the mixture of top gas and gaseous hydrocarbons in the mixture supply line 6, in this case a recuperator 16 for indirect heat exchange between the mixture of top gas and gaseous hydrocarbons in the mixture supply line 6 and the combustion off-gas in the drawing-off line 10.

A dedusting apparatus 18, in this case a wet-dedusting apparatus, is present in the discharge line 5 between the reduction unit 1 and the point at which the connection line 12 branches off.

A gas heating apparatus 19, in this case a recuperator for indirect heat exchange, a CO conversion reactor 20, a gas cooling apparatus 21 and a $CO_2$ removal apparatus 22 are present in succession in the connection line 12, as seen from the point at which the latter branches off from the discharge line 5.

Here, a steam supply line 23 issues into the connection line 12 upstream from the CO conversion reactor 20, as seen from the point at which said connection line branches off from the discharge line 5.

The discharge of steam which has been produced from the CO conversion reactor 20 is indicated by a dashed arrow which proceeds from the latter. The discharge of condensate from the gas cooling apparatus 21 is indicated by an arrow which proceeds from the latter. The discharge of a $CO_2$-rich gas flow from the $CO_2$ removal apparatus 22 is indicated by a dashed arrow which proceeds from the latter. By way of example, the $CO_2$-rich gas flow can be sequestered.

A hydrocarbon feed line 24 for gaseous hydrocarbons issues into the connection line 12 downstream from the $CO_2$ removal apparatus 22, as seen from the discharge line.

As indicated by an arrow, the metal oxides 3 reduced in the reduction unit 1 are removed from the reduction unit 1.

The top gas produced during the reduction is discharged out of the reduction unit through the discharge line 5. After dedusting in the dedusting apparatus 18, a partial quantity of the top gas is guided in the connection line 12 to the burners 8a, 8b, 8c, said top gas firstly being heated in the gas heating apparatus 19 to a temperature required for the CO conversion reactor 20 to function and, after steam has been supplied via the steam supply line 23, being subjected to the CO conversion reaction in the CO conversion reactor 20. The product obtained in the process, referred to as conversion gas, is cooled in the gas cooling apparatus 21 and steam carried along is removed therefrom by condensation, and $CO_2$ is then removed therefrom in the $CO_2$ removal apparatus 22. The $CO_2$-depleted product of this step, referred to as $CO_2$-depleted conversion gas, is used as fuel gas in the burners 8a, 8b, 8c after gaseous hydrocarbons have been admixed through the hydrocarbon feed line 24. The oxygen required for combustion is supplied via the oxygen supply line 13 in the form of air compressed by means of the blower 14.

Hot reducing gas is produced in the reformer 4 by reforming a mixture of top gas and gaseous hydrocarbons, and is fed to the reduction unit via the reducing gas supply line 9.

Figure 2:
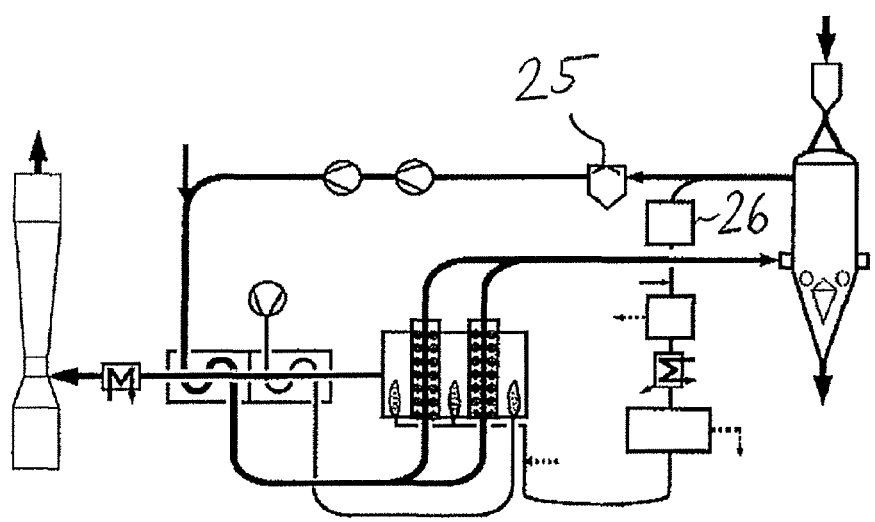
FIG. 2 shows an apparatus according to various embodiments with combined wet and dry dedusting.

FIG. 2 shows an apparatus analogous to FIG. 1, with the difference that there is no dedusting apparatus 18 and no gas heating apparatus 19. Instead,
  there is a dedusting apparatus 25 in the form of a wet-dedusting apparatus in the discharge line 5 downstream from the point at which the connection line 12 branches off, as seen from the reduction unit 1, and
  there is a dedusting apparatus 26 in the form of a dry-dedusting apparatus in the connection line 12 between the point at which the connection line 12 branches off from the discharge line 5 and the CO conversion reactor 20.

Since no temperature loss occurs in the dedusting apparatus 26, no gas heating apparatus 19 is needed to ensure that the temperature required for the CO conversion reactor is obtained. For greater clarity, only the apparatus parts which appear in addition in FIG. 2 compared to FIG. 1 are provided with reference symbols.

Figure 3:
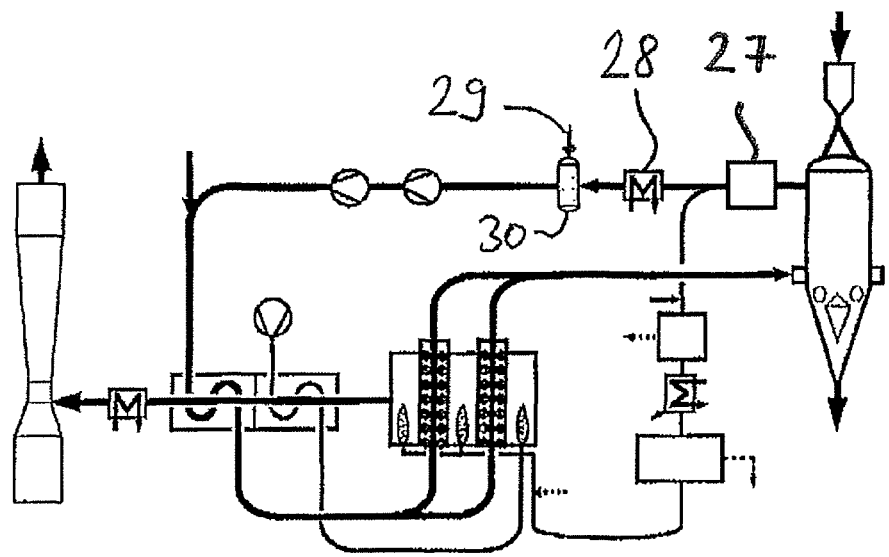
FIG. 3 shows an apparatus according to various embodiments purely with dry dedusting and cooling of the top gas.

FIG. 3 shows an apparatus analogous to FIG. 1, with the difference that there is no dedusting apparatus 18 and no gas heating apparatus 19.

Instead,
  there is a dedusting apparatus 27 in the form of a dry-dedusting apparatus in the discharge line 5 upstream from the point at which the connection line 12 branches off, as seen from the reduction unit 1, and
  there is an apparatus for cooling the top gas, which comprises the cooling element 28 designed as a recuperator and the gas cooler 30 operated with cooling water 29, in the discharge line 5 downstream from the point at which the connection line 12 branches off, as seen from the reduction unit 1.

Since no temperature loss occurs in the dedusting apparatus 27, no gas heating apparatus 19 is needed to ensure that the temperature required for the CO conversion reactor is obtained. For greater clarity, only the apparatus parts which appear in addition in FIG. 3 compared to FIG. 1 are provided with reference symbols.

Figure 4:
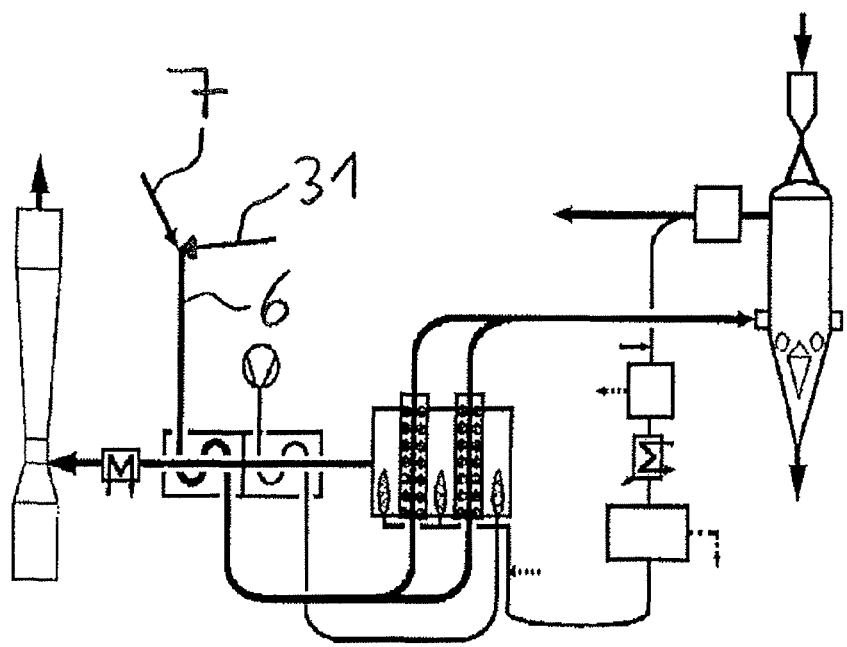
FIG. 4 shows a process corresponding to FIG. 2, where the gas containing carbon dioxide ($CO_2$) and/or steam ($H_2O$) originates from a source different to that in FIG. 2.

FIG. 4 shows an apparatus analogous to FIG. 2, with the difference that syngas from a coal gasification process containing up to 40% by volume carbon dioxide and up to 55% by volume steam is used instead of top gas as the gas containing carbon dioxide ($CO_2$) and/or steam ($H_2O$). This syngas from a coal gasification process (not shown) is fed into the mixture supply line 6 via the syngas line 31 which issues into the mixture supply line 6. The mixture of syngas and natural gas thereby generated in the mixture supply line 6 is reformed in the reformer 4. For greater clarity, only the apparatus parts which appear in addition in FIG. 4 compared to FIG. 2 and the natural gas line 7 are provided with reference symbols.

LIST OF REFERENCE SYMBOLS

1 Reduction unit
2 Oxide addition apparatus
3 Metal oxides
4 Reformer
5 Discharge line
6 Mixture supply line
7 Natural gas line
8a, 8b, 8c Burners
9 Reducing gas supply line
10 Drawing-off line
11 Apparatus for cooling/removing $H_2O$
12 Connection line
13 Oxygen supply line
14 Blower
15 Recuperator
16 Recuperator
17a, 17b Compressors
18 Dedusting apparatus
19 Gas heating apparatus
20 CO conversion reactor
21 Gas cooling apparatus
22 $CO_2$ removal apparatus
23 Steam supply line
24 Natural gas feed line
25 Dedusting apparatus
26 Dedusting apparatus
27 Dedusting apparatus
28 Cooling element
29 Cooling water
30 Gas cooler
31 Syngas line

What is claimed is:
1. An apparatus comprising:
  a reduction unit for the reduction of metal oxides to form metalized material, the reduction unit having a discharge line for discharging top gas from the reduction unit,
  a reformer that carries out catalytic reformation of a mixture of gas containing at least one of carbon dioxide and steam with gaseous hydrocarbons,
  wherein the reformer is provided with a mixture supply line for supplying the mixture of gas, and wherein the reformer is provided with burners, which are connected to an oxygen supply line, the burners providing heat for the catalytic reformation by combustion of a fuel gas and oxygen supplied by the supply line,
  the reformer having a drawing-off line for drawing off combustion off-gas from the reformer, and
  the reformer having a reducing gas supply line for providing hot reducing gas from the reformer into the reduction unit, the drawing-off line and the reducing gas supply line being different lines,
  wherein the burners are connected to the discharge line via a connection line which branches off from the discharge line, and
  wherein a dedusting apparatus is present either in the discharge line, between the reduction unit and the connection line, or in the connection line itself, and wherein the following devices are positioned between the dedusting device and the burners, in sequence: a CO conversion reactor, a gas cooling apparatus, and a $CO_2$ removal apparatus.

2. The apparatus according to claim 1, wherein a hydrocarbon feed line for gaseous hydrocarbons issues into the connection line.

3. The apparatus according to claim 2, wherein the hydrocarbon feed line for gaseous hydrocarbons issues into the connection line downstream from the $CO_2$ removal apparatus.

4. The apparatus according to claim 1, wherein the dedusting apparatus is a dry-dedusting apparatus.

5. The apparatus according to claim 1, wherein the dedusting apparatus is a wet-dedusting apparatus.

6. The apparatus according to claim 5, wherein a gas heating apparatus is present in the connection line between the wet-dedusting apparatus and the CO conversion reactor.

7. The apparatus according to claim 1, wherein the reduction unit is a fluidized bed cascade.

8. The apparatus according to claim 1, wherein the reduction unit is a fixed-bed reduction shaft.

9. A system for the reduction of metal oxides to form metalized material by contact with a reducing gas in a reduction unit, wherein the reducing gas is produced at least partially by catalytic reformation, in a reformer, of a mixture of gas containing at least one of carbon dioxide and steam with gaseous hydrocarbons, and the reducing gas is supplied from the reformer to the reduction unit via a reducing gas supply line, the system comprising:
  a burner that combusts a fuel gas to provide at least part of the heat for the endothermal reformation processes which take place during the catalytic reformation in the reformer, and
  a drawing-off line for drawing off the combustion off-gas produced by the burner for the endothermal reformation processes, the drawing-off line and the reducing gas supply line being different lines,
  wherein the system is configured to obtain fuel gas at least partially from a partial quantity of the top gas produced during the reduction of metal oxides to form metalized material,
  wherein the system is further configured to subject the partial quantity of the top gas, from which the fuel gas is obtained, firstly to dedusting and then to a CO conversion reaction in a CO conversion reactor to obtain conversion gas, and to subject the conversion gas obtained during the CO conversion reaction to $CO_2$ removal after cooling to obtain $CO_2$-depleted conversion gas, and to use the $CO_2$-depleted conversion gas produced in the process at least as a component of the fuel gas, the CO conversion reactor being located within the system to receive top gas from the reduction unit.

10. The system according to claim 9, wherein the system includes a reduction unit and the gas containing at least one of carbon dioxide and steam is top gas from the reduction unit.

11. The system according to claim 9, wherein the system includes a smelting reduction unit and the gas containing at least one of carbon dioxide and steam is export gas from the smelting reduction unit, or the system includes a coal gasification unit and the gas containing at least one of carbon dioxide and steam is syngas from the coal gasification unit.

12. The system according to claim 9, wherein gaseous hydrocarbons are admixed to the $CO_2$-depleted conversion gas in order to obtain fuel gas.

13. The system according to claim 9, wherein the dedusting takes place in dry form.

14. The system according to claim 9, wherein the dedusting takes place in wet form.

* * * * *